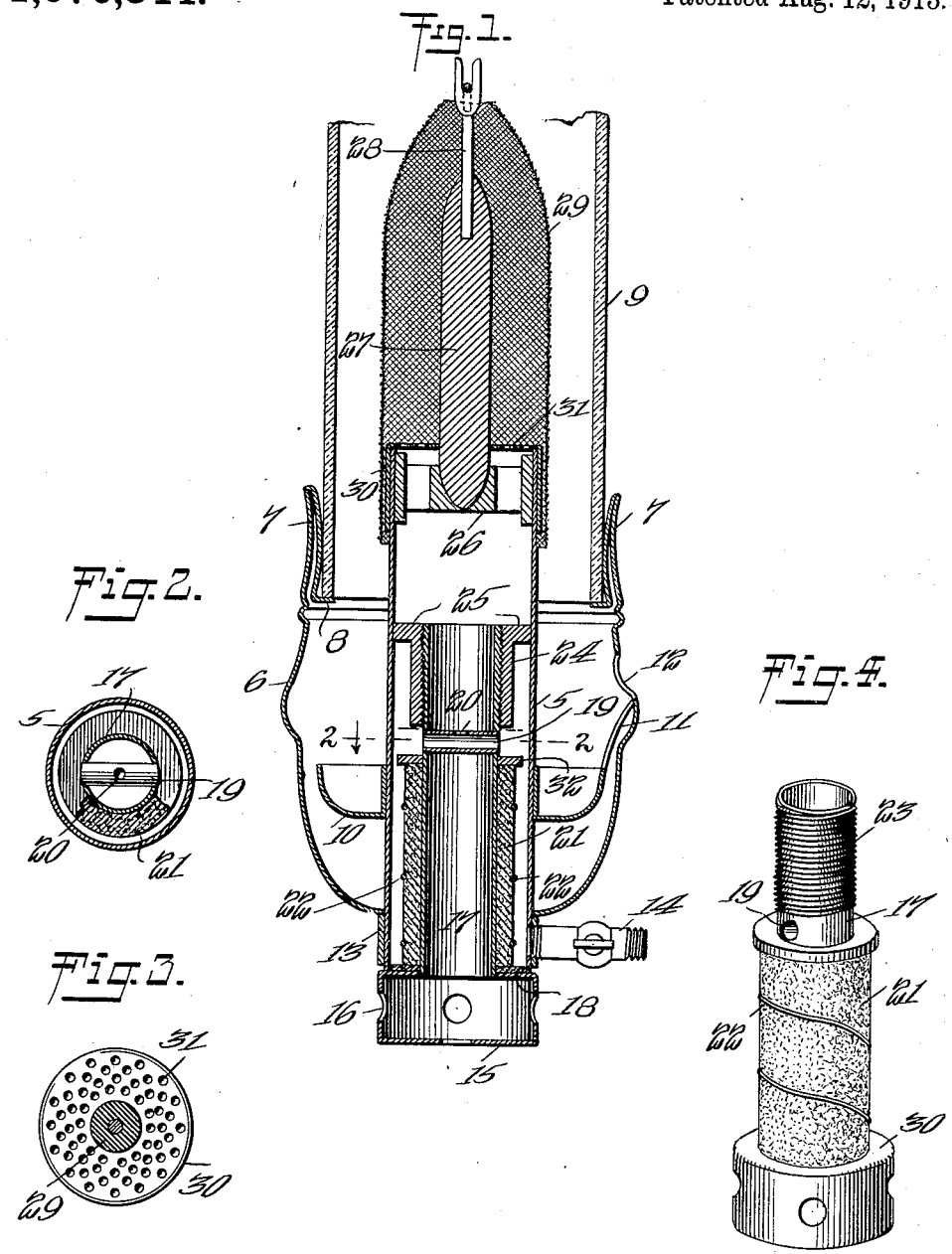

UNITED STATES PATENT OFFICE.

BIENVENIDO IGLESIAS, OF SANTO DOMINGO, DOMINICAN REPUBLIC.

BURNER.

1,070,344.  Specification of Letters Patent.  Patented Aug. 12, 1913.

Application filed March 26, 1913. Serial No. 756,895.

*To all whom it may concern:*

Be it known that I, BIENVENIDO IGLESIAS, a citizen of the Dominican Republic, and residing in Santo Domingo, in the said Dominican Republic, have invented certain new and useful Improvements in Burners, of which the following is a specification.

My invention relates to burners of the kind adapted to consume vapors, and more particularly alcohol vapor, the purpose of my improvement being to facilitate the formation and distribution of the vapor.

My invention further relates to various details of construction employed in connection with burners of this kind.

Reference is made to the accompanying drawing forming a part of this specification, and in which like letters indicate like parts.

Figure 1 is a substantially vertical section through my improved burner complete. Fig. 2 is a section through the burner tube and vaporizing tube, and is taken upon the line 2—2 of Fig. 1 looking in the direction of the arrow. Fig. 3 is a detail showing a protecting cap for preventing the flames from descending into the lamp. Fig. 4 is a detail showing in perspective, a part of the vaporizing mechanism.

The burner tube is shown at 5, and encircling the same is the burner casing 6. This burner casing is provided with an upper portion 7 which supports an annular shelf 8, serving as a gallery. The chimney is shown at 9 and is supported by the annular shelf 8. A pan 10, made of metal, and having an annular form, encircles the burner tube 5 and is provided with a strip 11 which is secured to the casing 6. This strip is slightly curved and serves the double purpose of a brace for the pan 10 and a guide or spout for guiding the combustible fluid into the pan. The casing 6 is further provided with an opening 12 disposed just above the strip 11 and in convenient position to facilitate the introduction of the liquid fuel.

Encircling the lower end of the burner tube 5 is a band 13, and extending through the wall of this band and through the adjacent portion of the burner tube 5 is a valve 14. This valve is used for supplying liquid fuel to the burner tube 5, the liquid fuel in the pan 10 being outside of the burner tube 5, as indicated in Fig. 1.

A cylindrical nozzle 15 provided with openings 16 is employed for admitting air to the lamp. The mixing tube is shown at 17 and at its lower end is secured directly to the nozzle 15. An asbestos ring 18 encircles the mixing tube 17 and is located between the nozzle 15 and the adjacent lower end of the burner tube 5. Extending diametrically through the mixing tube 17 is a cross tube 19 provided with a small opening 20, this opening extending upwardly and being the only opening connecting the interior of the mixing tube 17 with the cylindrical space between this mixing tube and the burner tube 5. A cylindrical wick 21 made of any absorbent material such as cotton, or asbestos, encircles the mixing tube 17 and is held in position thereupon by aid of a spiral wire 22, which serves as a fastening. The upper portion of the mixing tube 17 is provided externally with a thread 23. Fitted upon the upper or thread portion of the burner tube 17 is a cylinder 24, which is provided with a flange 25 integral with it and secured rigidly to the burner tube 5.

A spider 26 is fitted within the upper end of the burner tube 5. A heating rod 27 is supported by the spider 26 and extends upwardly from the same. The heating rod 27 carries at its upper end a supporting fork 28, and hanging from the latter is a mantle 29. A protecting cap 30 made of metal is provided with holes 31, and is fitted over the upper end of the burner tube 5, this cap being encircled by the lower end of the mantle 29.

A collar 32 rests upon the wick 21 and is supported upon the upper end of the cylindrical wick.

By turning the nozzle 15 so as to unscrew the mixing tube, the latter may be readily removed.

The operation of my device is as follows:—I first pour a little alcohol through the opening 12 into the pan 10. This alcohol is lighted and serves to heat the burner tube 5, the gases of combustion making their escape upwardly around the mantle 29. The valve 14 having been turned so as to admit alcohol into the lower end of the burner tube 5, this alcohol is soaked up by the wick and gradually becomes vaporized and passes into the cross tube 19 and up through the opening 20, into the mixing tube 17. The vapor here entrains more or less air, which is drawn through the holes 16 and passes upwardly through the mixing tube. The vapor and air admixed therewith together constitute a combustible mixture which passes up through the spider 26 and through the openings 21 into the cylindrical space between the mantle 29 and the heating rod 27. Flame now reaching to the mantle, the combustion takes place at the surface of the mantle. The temperature of the heating rod 27 is raised, and as a consequence the heat is distributed through the spider 26 to the burner tube 5. These parts being of metal the heat spreads downwardly to the bottom of the burner tube and causes continuous vaporization of the alcohol contained within the lower end thereof. The wick 21 because of its absorbent nature, holds the alcohol in good shape to be vaporized and presents a large surface which facilitates vaporization. The alcohol contained within the annular pan 10 soon becomes exhausted and therefore no longer heats the burner tube 5, but this fact is immaterial as the burner tube is heated from the heating rod 27, and to some extent, from the mantle directly. By grasping the nozzle 15 and turning the same, the vapor tube may be removed for the purpose of cleaning the various parts of the burner.

The nozzle 15 performs three offices, it closes the bottom of the burner tube 5; it helps to conduct air into the mixing chamber; and assist in the formation of the vapor. It is not readily obstructed and can easily be removed.

I do not limit myself to the precise construction shown, as various changes may be made within without departing from the spirit of my invention.

I claim:—

A burner comprising a burner tube, a sleeve mounted therein and provided internally with a thread, a mixing tube located within said burner tube and provided with a thread mating said thread of said sleeve for the purpose of enabling said mixing tube to be removed from said burner tube, a cross tube extending diametrically through said burner tube and provided with an opening communicating with the inside of said mixing tube, said cross tube communicating with the space between said mixing tube and said burner tube, and a collar mounted within said burner tube and encircling said mixing tube.

BIENVENIDO IGLESIAS.

Witnesses:
 RAFAEL M. RODRIGUEZ,
 ULISES ALIENS.

---

Copies of this patent may be obtained for five cents each, by addressing the "Commissioner of Patents, Washington, D. C."